M. JÜLLIG.
APPARATUS FOR DETECTING PIPE LEADS OR OTHER METALLIC MASSES EMBEDDED IN MASONRY.
APPLICATION FILED NOV. 25, 1913.
1,126,027. Patented Jan. 26, 1915.
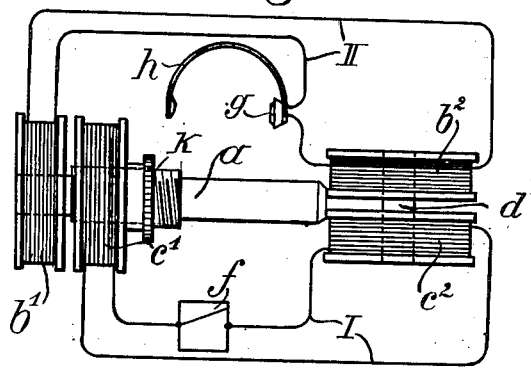
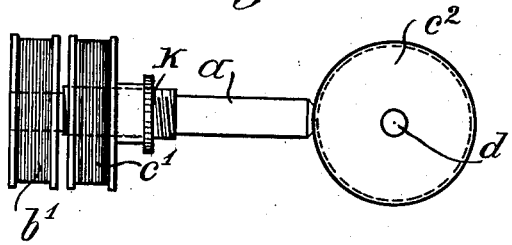
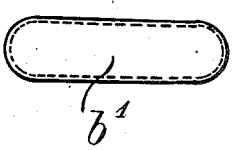
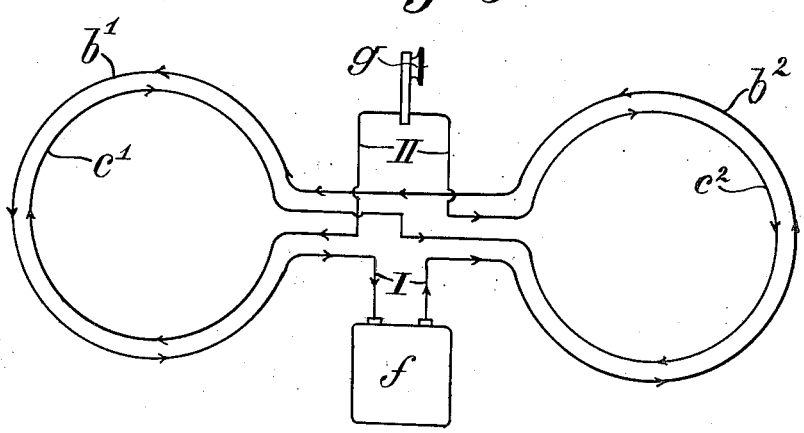

UNITED STATES PATENT OFFICE.

MAX JÜLLIG, OF VIENNA, AUSTRIA-HUNGARY.

APPARATUS FOR DETECTING PIPE-LEADS OR OTHER METALLIC MASSES EMBEDDED IN MASONRY.

1,126,027.　　　　　Specification of Letters Patent.　　Patented Jan. 26, 1915.

Application filed November 25, 1913. Serial No. 802,907.

*To all whom it may concern:*

Be it known that I, Dr. MAX JÜLLIG, a subject of the Emperor of Austria-Hungary, residing at Vienna, Austria-Hungary, have invented certain new and useful Improvements in Apparatus for Detecting Pipe-Leads or other Metallic Masses Embedded in Masonry, of which the following is a specification.

My invention relates to apparatus for detecting pipe leads or other metallic masses embedded in masonry or otherwise inaccessible, the apparatus being of the kind in which the inductive action of an alternating or interrupted current is used for acting on an indicating apparatus. Heretofore, said inductive action on the indicating apparatus was brought about by connecting the pipe lead to the source of alternating or interrupted current and by providing said indicating apparatus with an induction coil on which the varying currents in the pipe lead could act. In this manner, however, it was only possible to determine the position of a particular piping known beforehand to be at the place to be searched and, furthermore, access was necessary at some places in order to establish the connection with the source of current.

Now, the object of my invention is to provide a self-contained apparatus which, without any external means, permits the detecting of inaccessible or concealed pipings or other metallic masses, even if no access at all may be had to them and whether or not the existence or the character of such piping be known beforehand. It is obvious that such an apparatus will be of great advantage if the position of one or more pipings of a system is to be traced, especially where new pipe leads or branches, or connections have to be made, without interference with the existing pipe leads.

The invention shall be explained with reference to the accompanying drawing in which—

Figure 1 is a side view and Fig. 2 a plan view of the apparatus. Fig. 3 is a diagram showing the connections, Figs. 4, 5 and 6 show modifications of a coil, which are adapted especially for the use at the corners of walls.

Referring to Figs. 1 and 2, $b^1$ $c^1$ and $b^2$, $c^2$ indicate each a pair of coils respectively which are mounted on a bar or handle $a$. The carriers on which the coils consisting of insulated wires of good conductivity are mounted, as well as the bar or handle $a$ are made of wood or of hard rubber or of some other insulating material. Each of the coils of the pair $b^1$ $c^1$ is included in an electric circuit I II (Figs. 1 and 3) with one of the coils of the other pair $b^2$ $c^2$ by means of suitable connecting wires. In one of these circuits (for instance the circuit II) a telephone $g$ is connected, while the other (I in Figs. 1 and 3) is connected to a source of electric energy $f$. This source of electric energy supplies either undulating or alternating or intermittent currents. A screw $k$ (Fig. 1), or wedge can be provided for varying the distance of the coils $b^1$ or $b^2$ from the coils $c^1$ or $c^2$ respectively.

The operation of the apparatus described will be as follows: The alternating or intermittent currents of the source of supply $f$, in the circuit I, are generating electromotive forces in the coils $b^1$, $b^2$ which are, according to the connection shown in Fig. 3 opposed to each other. If the number of turns of the coils and the shape of the same is suitably chosen an adjustment of the coils can take place, at which a complete or almost complete neutralization of the generated electromotive forces takes place, so that no sound will be heard in the telephone. If now the coil $b^1$ approaches a body which is a conductor of electricity, the equilibrium of the electromotive forces that has been obtained as previously mentioned will be disturbed, and a buzzing in the telephone will take place. Of course, this will also occur if the coil $b^1$ is placed in the proximity of a tube or pipe lead embedded in masonry, and therefore the place at which such pipe lead is situated will be indicated by the telephone or other receiver. The cross section of the coils may be circular or polygonal or elliptical or of any other suitable shape. If a pipe is to be detected that is located in a wall corner a cross section according to Fig. 6 is preferably to be used. Instead of such cross section also a conical shape as indicated in Fig. 5 or a stepped coil (Fig. 4) may be of advantage. As will be seen, such a shaping of the coils allows to approach their windings as closely as possible to the walls of a corner and therefore to the pipings to be detected.

It is furthermore material for the purposes of the present invention that the axis of the pair of coils $b^1$ $c^1$ is at right angles to the axis of the coils $b^2$ $c^2$ or at least the angle between the said axes should not materially differ from a right angle.

Claims—

1. Apparatus for detecting pipe leads or other metallic masses comprising coils arranged in pairs, the coils of each pair being arranged in proximity to, and adapted to act inductively on, each other, separate circuits for each of two adjacent coils, each circuit including coils of different pairs, means for supplying one of said circuits with varying currents, and an indicating instrument in the circuit of the adjacent coils, the connection of the coils of said circuit being such that the electromotive forces generated in coils of different pairs are opposing each other.

2. Apparatus for detecting pipe leads or other metallic masses comprising two pairs of coils, the coils of each pair being arranged in proximity to, and adapted to act inductively on, each other, two separate circuits for each of two adjacent coils, each circuit including coils of both pairs, means for supplying one of said circuits with varying currents, and an indicating instrument in the other circuit, the connection of the coils of said circuit being such that the electromotive forces generated in coils of different pairs are opposing each other.

3. Apparatus for detecting pipe leads or other metallic masses comprising two pairs of coils, each pair arranged about the same axis and the axes of the two pairs being substantially at right angles to each other, the coils of each pair being arranged in proximity to, and adapted to act inductively on, each other, two separate circuits for each of two adjacent coils, each circuit including coils of both pairs, means for supplying one of said circuits with a varying current, and an indicating instrument included in the other circuit, the coils of said circuit being so connected that the electromotive forces generated in coils of different pairs are opposing each other.

4. Apparatus for detecting pipe leads or other metallic masses comprising two pairs of coils both pairs arranged upon an insulating handle, the coils of each pair arranged in proximity to, and adapted to act inductively on, each other, means for adjusting the distance between the coils of each pair, two separate circuits for each of two adjacent coils, each circuit including coils of both pairs, means for supplying one of said circuits with a varying current, and a telephone receiver included in the other circuit, the coils of said circuit being in such connection that the electromotive forces generated in coils of different pairs are opposing each other.

5. Apparatus for detecting pipe leads or other metallic masses, comprising two pairs of coils both arranged upon an insulating handle and having a small end capable of entering into the corners of walls, the coils of each pair being arranged in proximity to, and adapted to act inductively on, each other, means for adjusting the distance between the coils of each pair, two separate circuits for each of two adjacent coils, each circuit including coils of both pairs, means for supplying one of said circuits with a varying current, and a telephone receiver included in the other circuit, the coils of said circuit being in such connection that the electromotive forces generated in coils of different pairs are opposing each other.

6. Apparatus for detecting pipe leads or other metallic masses, comprising two pairs of coils both arranged upon an insulating handle, the axis of one pair being substantially perpendicular to the axis of the other pair, the coils of each pair being arranged in proximity to each other so as to allow inductive action between said coils and the coils themselves having a substantially conical shape so as to be capable of entering the corners of the wall, two separate circuits for each of two adjacent coils, each circuit including coils of both pairs, means for supplying one of said circuits with a varying current, and a telephone receiver included in the other circuit, the coils of said circuit being in such connection that the electromotive forces generated in coils of different pairs are opposing each other.

In testimony whereof I have affixed my signature in presence of two witnesses.

Dr. MAX JÜLLIG.

Witnesses:
 Ada Maria Berger,
 August Fugger.